US008542963B2

(12) United States Patent
Nakagawa et al.

(10) Patent No.: US 8,542,963 B2
(45) Date of Patent: Sep. 24, 2013

(54) METHOD FOR MANUFACTURING OPTICAL COUPLING ELEMENT, OPTICAL TRANSMISSION SUBSTRATE, OPTICAL COUPLING COMPONENT, COUPLING METHOD, AND OPTICAL INTERCONNECT SYSTEM

(75) Inventors: Shigeru Nakagawa, Kanagawa (JP); Hidetoshi Numata, Kanagawa (JP); Kuniaki Sueoka, Kanagawa (JP); Yoichi Taira, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 12/770,251

(22) Filed: Apr. 29, 2010

(65) Prior Publication Data
US 2010/0278485 A1 Nov. 4, 2010

(30) Foreign Application Priority Data

Apr. 30, 2009 (JP) ................................ 2009-110334

(51) Int. Cl.
G02B 6/34 (2006.01)
G02B 6/12 (2006.01)
G02B 6/26 (2006.01)
G02B 6/42 (2006.01)

(52) U.S. Cl.
USPC .................... 385/36; 385/14; 385/31; 385/47

(58) Field of Classification Search
USPC .......................................... 385/47, 31, 36, 14
See application file for complete search history.

(56) References Cited

U.S. PATENT DOCUMENTS

| | | | |
|---|---|---|---|
| 4,732,446 A * | 3/1988 | Gipson et al. ................... | 385/24 |
| 6,829,398 B2 * | 12/2004 | Ouchi ............................. | 385/14 |
| 6,847,765 B2 * | 1/2005 | Nishimura ...................... | 385/50 |
| 6,952,504 B2 * | 10/2005 | Bi et al. .............................. | 385/9 |
| 6,973,248 B2 * | 12/2005 | Kropp ........................... | 385/131 |
| 6,987,906 B2 * | 1/2006 | Nakama et al. ................. | 385/31 |
| 7,136,551 B2 * | 11/2006 | Cho et al. ........................ | 385/31 |
| 7,149,376 B2 * | 12/2006 | Uchida et al. ................... | 385/15 |
| 7,149,389 B2 * | 12/2006 | Yoon et al. ...................... | 385/43 |
| 7,242,822 B2 * | 7/2007 | Yamada et al. ................. | 385/14 |
| 7,263,256 B2 * | 8/2007 | Kim et al. ....................... | 385/32 |

(Continued)

FOREIGN PATENT DOCUMENTS

| | | |
|---|---|---|
| JP | 62018504 A | 1/1987 |
| JP | 7-164549 A | 6/1995 |
| JP | 9218304 A | 8/1997 |
| JP | 2001507476 | 6/2001 |
| JP | PUPA 2001-195771 | 7/2001 |
| JP | 2001305304 A | 10/2001 |
| JP | 2004085913 A | 3/2004 |
| JP | 2004318081 A | 11/2004 |
| JP | 2005010334 A | 1/2005 |
| JP | 2005070141 A | 3/2005 |
| JP | 2005268752 A | 9/2005 |
| JP | 2006-2151 | 8/2006 |
| JP | PUPA 2006-259590 | 9/2006 |
| JP | 2007133036 A | 5/2007 |
| WO | WO 2009136910 A1 * | 11/2009 |

*Primary Examiner* — Rhonda Peace
(74) *Attorney, Agent, or Firm* — Tutunjian & Bitetto, P.C.; Preston J. Young

(57) ABSTRACT

An optical coupling structure that interfaces between optical devices mounted on a substrate and optical waveguides formed in the substrate. A manufacturing method includes preparing a wafer formed on an inorganic solid material on a dicing tape and cutting the back surface of the wafer to form substantially angled portions using a dicing blade having a point angle. The dicing tape is stripped from the wafer and the wafer is separated at the valleys between the substantially angled portions to obtain an optical coupling element. The obtained optical coupling element is a three-dimensional polyhedral light-reflecting member having a mirror surface corresponding to a surface of the wafer. The obtained optical coupling element is inserted into a trench that opens, substantially perpendicular to an optical waveguide of an optical transmission substrate, in the main surface of the optical transmission substrate to provide a structure for optical coupling with the outside.

16 Claims, 14 Drawing Sheets

(56) References Cited

U.S. PATENT DOCUMENTS

| | | | |
|---|---|---|---|
| 7,316,512 B2* | 1/2008 | Shih et al. | 385/93 |
| 7,526,153 B2* | 4/2009 | Uchida | 385/18 |
| 7,630,601 B2* | 12/2009 | Mershon et al. | 385/36 |
| 7,796,851 B2* | 9/2010 | Yonekura et al. | 385/47 |
| 2003/0039455 A1* | 2/2003 | Ouchi | 385/88 |
| 2003/0174965 A1* | 9/2003 | Nishimura | 385/50 |
| 2003/0180002 A1* | 9/2003 | Nishimura | 385/48 |
| 2004/0022496 A1* | 2/2004 | Lam | 385/49 |
| 2004/0042705 A1* | 3/2004 | Uchida et al. | 385/14 |
| 2004/0096152 A1* | 5/2004 | Nakama et al. | 385/31 |
| 2004/0264838 A1* | 12/2004 | Uchida et al. | 385/14 |
| 2005/0089276 A1* | 4/2005 | Yoon et al. | 385/43 |
| 2005/0163416 A1* | 7/2005 | Yamada et al. | 385/14 |
| 2006/0245681 A1* | 11/2006 | Uchida | 385/14 |
| 2008/0170822 A1* | 7/2008 | Bae et al. | 385/18 |
| 2010/0278485 A1* | 11/2010 | Nakagawa et al. | 385/38 |
| 2011/0129181 A1* | 6/2011 | Bolle | 385/14 |

* cited by examiner (A)
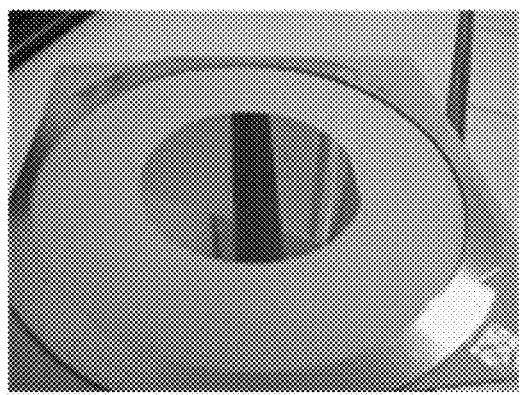
FIG. 10
(B)
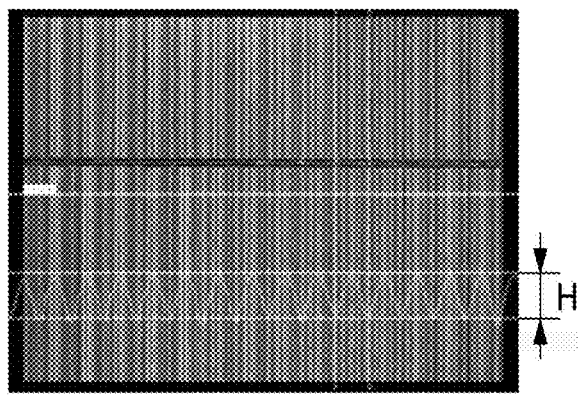
(C)
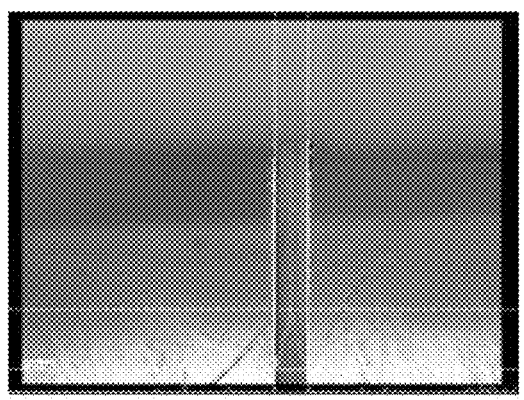

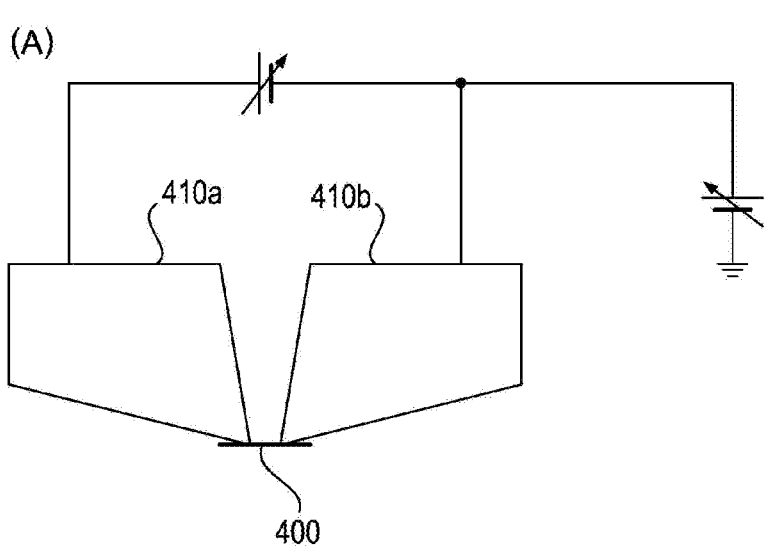
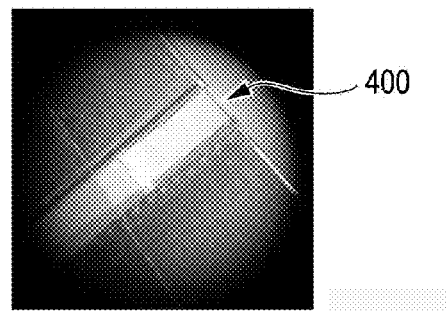
FIG. 12

METHOD FOR MANUFACTURING OPTICAL COUPLING ELEMENT, OPTICAL TRANSMISSION SUBSTRATE, OPTICAL COUPLING COMPONENT, COUPLING METHOD, AND OPTICAL INTERCONNECT SYSTEM

CROSS REFERENCE TO RELATED APPLICATION

This application claims priority under 35 U.S.C. 119 from Japanese Patent Application 2009-110334, filed Apr. 30, 2009, the entire contents of which are incorporated herein by reference.

BACKGROUND OF THE INVENTION

1. Field of the Invention

The present invention relates to optical wiring technology. More particularly, it relates to a method for manufacturing an optical coupling element for providing an optical coupling structure that interfaces between optical devices mounted on a substrate and optical waveguides formed on the substrate.

2. Description of Related Art

In recent years, high-end server systems have introduced a technology for interconnected processors and cores using optical wiring to achieve higher-speed information processing. As the performance of the central processing unit (CPU) of a server system increases, packaging density and the number of CPU cores increase, thus increasing the number of channels of an optical data link per unit processor-core. Under such circumstances, development of a technology for interconnecting devices, such as processors and memories, at high speed and high density is being required.

As a promising candidate of the technology for interconnecting devices at high speed and high density, as described above, a technology for achieving a data link among chips on a printed circuit board (PCB) through optical waveguides formed on the surface of the PCB attracts attention. However, this technology has a problem in achieving the interface between the optical waveguides formed on the board and chips on the board at high efficiency.

FIG. 14 shows a cross sectional view of an optical coupling structure for an optical waveguide and the outside according to related art. The optical coupling structure 500 shown in FIG. 14 includes an electrical wiring board 502 on which electrical wiring is provided and an optical wiring layer 506 formed on the surface of the electrical wiring board 502. The optical wiring layer 506 includes a core 508 that transmits an optical signal and clad layers 504*a* and 504*b* formed so as to enclose the core 508. The optical wiring layer 506 has, in the path of the core 508, an end face 512 perpendicular to the optical axis of the core 508 and to the top surface of the electrical wiring board 502 and a reflecting surface 510 having an inclination angle of 45° cut out. The reflecting surface 510 and the end face 512 are formed by laser beam machining, and the reflecting surface 510 is masked with gold, aluminum, or the like by vapor deposition.

With the optical coupling structure 500 shown in FIG. 14, light that propagates in the core 508 travels in the core 508 in the direction indicated by the dotted-chain line, exits from the end face 512, is incident on the reflecting surface 510 at an incidence angle of 45°, where it is reflected at a right angle to the outside of the board. The light exiting to the outside is introduced into a receiver or the like on the board. If a transmitter or the like is provided on the board, light exiting from the transmitter is incident on the reflecting surface 510 at an incidence angle of 45°, where it is reflected at a right angle into the core 508 through the end face 512 and propagates in the core 508 reversely. In this manner, with the optical coupling structure 500 shown in FIG. 14, optical devices mounted on the board, such as a receiver and a transmitter, and the optical waveguide of the board are interfaced.

Another method for forming a reflecting surface for an optical communication interface includes technology disclosed in Japanese Unexamined Patent Application Publication No. 2001-195771. A micromirror is formed on a silicon substrate by anisotropic etching or forming a half-mirror by forming an optical waveguide in contact with a micromirror surface formed on a silicon substrate by anisotropic etching and transferring the shape of the micromirror to an end face of the optical waveguide. Furthermore, Japanese Unexamined Patent Application Publication No. 2006-259590 discloses a technology for forming a 45° mirror surface by cutting a submount at an angle of 45° with respect to the optical axis using a dicing saw with an angle of 45°.

In the optical coupling structure 500 shown in FIG. 14, the reflecting surface 510 and the end face 512 are processed to about 50 μm to several millimeters in size. The reflecting surface 510 has been formed by laser beam machining. However, the laser beam machining degrades in machining performance for inclined surfaces and significantly degrades in machining performance, in particular, for minute regions. Therefore, the method is not enough to obtain a reflecting surface with high flatness, resulting in increasing a reflection loss.

The technologies disclosed in Japanese Unexamined Patent Application Publications No. 2001-195771 and No. 2006-259590 form a reflecting surface on a silicon substrate. Accordingly, those technologies neither form the reflecting surface in the optical wiring layer 506, as shown in FIG. 14, nor dispose a reflecting surface formed in a silicon substrate in the optical wiring layer 506. In addition, with the technology of the Japanese Unexamined Patent Application Publications described above, since the reflecting surface itself is formed by being cut with a dicing saw, it is not enough because it is difficult to obtain a reflecting surface with high flatness, thus resulting in an increase in reflection loss.

Thus, it has still been required to develop a technology for interfacing between optical waveguides formed on an optical transmission substrate and optical devices on the optical transmission substrate at high efficiency with a low reflection loss.

SUMMARY OF THE INVENTION

In accordance with one aspect of the present invention, a method for manufacturing an optical coupling element includes preparing a wafer formed of an inorganic solid material on a dicing tape, cutting the back surface of the wafer to form substantially angled portions using a dicing blade having a point angle. The dicing tape is stripped from the wafer and the wafer is separated at the valleys between the substantially angled portions to obtain, as the optical coupling element, a three-dimensional polyhedral light-reflecting member having a mirror surface corresponding to a surface of the wafer.

In accordance with another aspect of the present invention, an optical transmission substrate that transmits an optical signal includes an optical waveguide and an optical coupling unit provided in a trench that opens in the main surface of the substrate, substantially perpendicular to the optical waveguide and in close contact with an end face of the optical waveguide. The optical coupling unit includes a three-dimensional polyhedral light-reflecting member formed of an inorganic solid material and having a mirror surface that obliquely intersects the optical axis of the optical waveguide to provide the optical transmission substrate with a structure for optical coupling with the outside.

In accordance with a further aspect of the present invention, an optical coupling component is inserted into a trench that opens, substantially perpendicular to an optical waveguide of an optical transmission substrate, in the main surface of the optical transmission substrate. The optical coupling component includes a three-dimensional polyhedral light-reflecting member formed of an inorganic solid material and having a mirror surface configured to obliquely intersect the optical axis of the optical waveguide whose end face is in close contact with the optical coupling component to provide the optical transmission substrate with a structure for optical coupling with the outside.

In accordance with a still further aspect of the present invention, a method is provided for interfacing an optical waveguide of an optical transmission substrate that transmits an optical signal with the outside. The method includes opening a trench substantially perpendicular to the optical waveguide in the main surface of the optical transmission substrate and forming an optical coupling unit in the trench and in close contact with an end face of the optical waveguide. The optical coupling unit includes a three-dimensional polyhedral light-reflecting member formed of an inorganic solid material and having a mirror surface that obliquely intersects the optical axis of the optical waveguide to provide the optical transmission substrate with a structure for optical coupling with the outside.

BRIEF DESCRIPTION OF THE DRAWINGS

FIG. 10(A) is a picture showing the appearance of a diced silicon wafer; FIG. 10(B) is a diagram showing a profile obtained by measuring the heights of the front and back surfaces of the cut portion of the wafer; and FIG. 10(C) is a diagram showing a cutout rod-like silicon mirror.

FIG. 12(A) is a schematic diagram showing the state of a silicon mirror electrostatically attracted to the tips of support plates of an electrostatic holding device; and FIG. 12(B) is a picture of the same.

Figure 1:
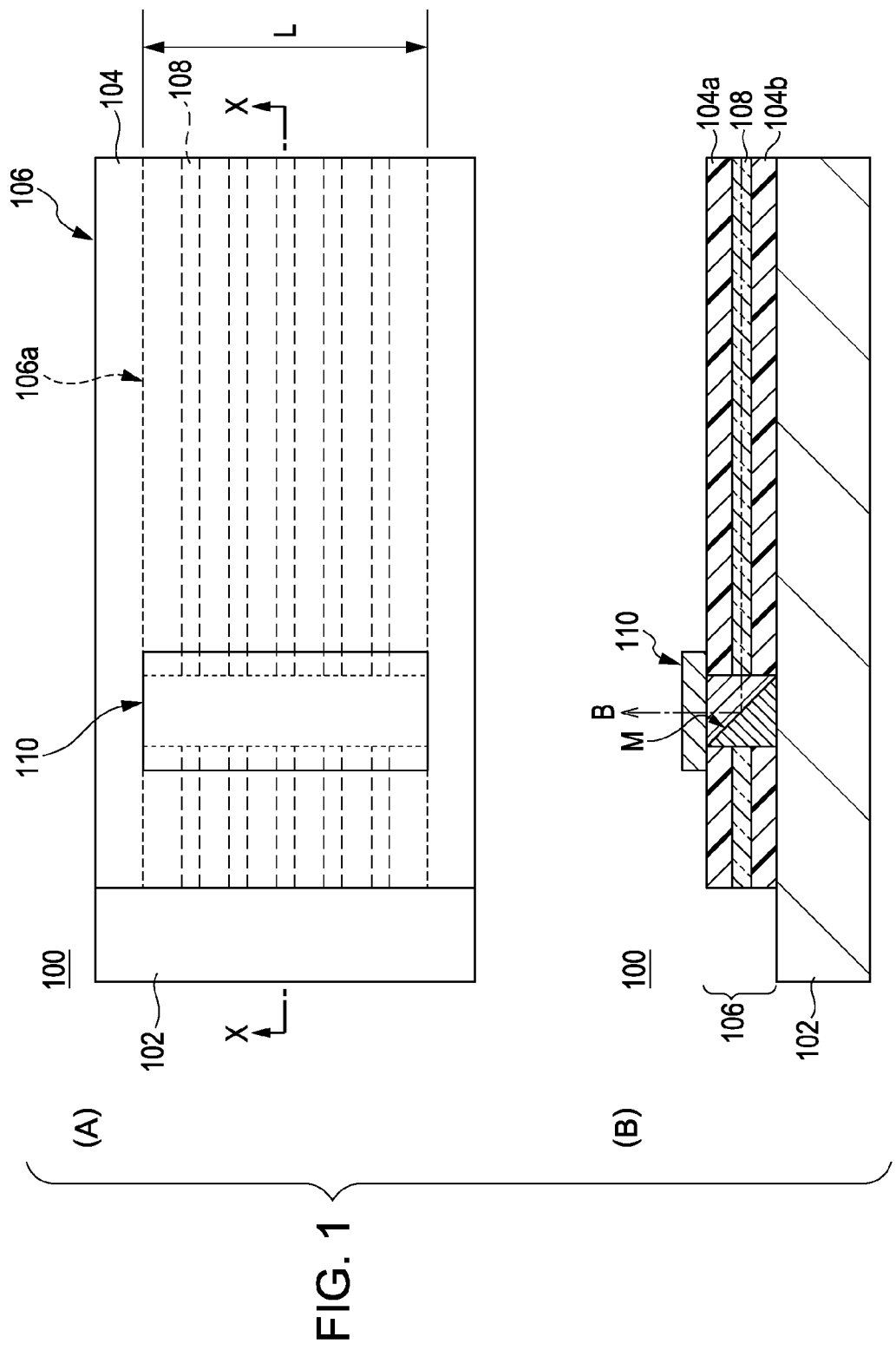
FIG. 1 shows the configuration of an optical printed circuit board according to a first embodiment of the present invention.

While embodiments of the present invention are described hereinbelow with reference to the attached drawings, the present invention is not limited to the embodiments shown in the attached drawings. Note that the attached drawings are not always scaled down or up according to scale.

DETAILED DESCRIPTION OF PREFERRED EMBODIMENTS

In accordance with the present invention, an optical coupling structure capable of achieving a high-efficiency interface with a low reflection loss is achieved by using, as the light reflecting member, a three-dimensional polyhedral member having a mirror surface corresponding to the front surface of a wafer formed of an inorganic solid material, the polyhedral member being obtained by cutting the back surface of the wafer with a dicing blade and by separating it, thus arriving at the present invention.

Specifically, according to the present invention, a method for manufacturing an optical coupling element inserted into a trench that opens, substantially perpendicular to an optical waveguide of an optical transmission substrate, in the main surface of the optical transmission substrate provides the optical transmission substrate with a structure for optical coupling with the outside.

According to the manufacturing method a wafer is formed of an inorganic solid material is mounted on a dicing tape. The back surface of the wafer is cut to form substantially angled portions using a dicing blade having a point angle. The dicing tape is stripped from the wafer and the wafer is separated at the valleys between the substantially angled portions to obtain, as the optical coupling element, a three-dimensional polyhedral light-reflecting member having a mirror surface corresponding to a surface of the wafer.

With the configuration described above, the surface of the wafer, which is polished into a mirror surface with high flatness by chemical-mechanical polishing or the like and is not subjected to machining using a dicing blade or the like, can be used as the mirror surface of the light-reflecting member. This allows high reflection efficiency. The wafer surface can be provided with a metal layer or a coating in advance, so the reflection efficiency can easily be improved. Furthermore, since the obtained light-reflecting member is processed with high accuracy by the dicing blade, it is advantageous also in aligning the mirror surface to a predetermined inclination angle with respect to the optical axis of the optical waveguide.

According to the present invention, an optical coupling component including the three-dimensional polyhedral light-reflecting member and having a shape to be fitted in a trench having an inner wall surface that is substantially perpendicular to the substrate main surface can be formed. Furthermore, according to the present invention, concave portions can be formed at positions on the surface of the wafer corresponding to the channels of the optical waveguide in advance by etching the surface of the wafer. The above configuration allows a concave pattern that is in accurate alignment with the cutting pattern of the back surface of the wafer to be formed on the surface of the wafer. Thus, it can be said that this manufacturing method is advantageous in terms of forming a mirror surface having concave portions corresponding to the cores of the optical waveguide. According to the present invention, the optical coupling unit can have, in correspondence with the channels of the optical waveguide, a vertical optical waveguide structure formed of a material having a light refractive index higher than or equal to the light refractive index of the material of the cores of the optical waveguide. The above vertical optical waveguide structure can include a portion that is in contact with the light-reflecting member of the optical coupling unit and having a light refractive index higher than the material of the cores. In this case, a light confining effect can be obtained even in the vicinity of the reflecting portion, thus satisfactorily reducing a loss in interfacing.

According to the present invention, the wafer can be cut to form the substantially angled portions at a pitch interval shorter than or equal to the length of the short side of the base of the trench that opens in the main surface of the optical transmission substrate. Furthermore, the light-reflecting member can be configured such that the mirror surface is inclined at substantially 45° with respect to the outer wall of the optical coupling component that is substantially perpendicular to the optical axis of the optical waveguide. The point angle of the dicing blade can be set at substantially 90°.

An optical transmission substrate transmits an optical signal. The optical transmission substrate includes an optical coupling unit in a trench that opens in the main surface of the substrate substantially perpendicular to the optical waveguide. The optical coupling unit is provided with a three-dimensional polyhedral light-reflecting member formed of an inorganic solid material and having a mirror surface that obliquely intersects the optical axis of the optical waveguide in close contact with an end face of the optical waveguide. The optical coupling unit provides the optical transmission substrate with a structure for optical coupling with the outside.

With the above configuration of the present invention, the reflection surface is provided by the mirror surface of the three-dimensional polyhedral light-reflecting member that is processed with high accuracy independently from the optical transmission substrate. Accordingly, the optical coupling structure can efficiently interface between the optical waveguide of the optical transmission substrate and the outside with a low reflection loss.

According to the present invention, the surface cut out from the wafer as the mirror surface can be used as the light-reflecting member of the three-dimensional polyhedral light-reflecting member. Since the surface of the wafer can be polished into the mirror surface by chemical-mechanical polishing, significantly high flatness can be achieved. The above configuration allows the high-flatness wafer surface can be used as the mirror surface, thus allowing high reflection efficiency to be achieved. Furthermore, since the wafer surface can be provided with a metal layer or a coating in advance, it is advantageous in improving the reflection efficiency.

According to the present invention, the trench that opens in the substrate main surface substantially perpendicular to the optical waveguide can have an inner wall surface that is substantially perpendicular to the substrate main surface. The optical coupling unit can be formed in such a manner that an optical coupling component formed in a shape to be fitted in the trench is inserted into the trench. With the above configuration, the light-reflecting member is modularized into a shape that is to be fitted in the trench that opens in the optical transmission substrate, which makes it easy to align the optical axis of the optical waveguide and the mirror surface when forming the optical coupling structure.

Furthermore, the mirror surface can be provided as a surface of the three-dimensional polyhedron and may have concave portions corresponding to the channels of the optical waveguide. The above configuration allows the concave portions formed on the mirror surface to function as concave mirrors, thus satisfactorily reducing the spread of light reflected by the mirror surface.

The three-dimensional polyhedron may be a triangular prism. Light emitted from the end face of the optical waveguide is reflected in a direction substantially perpendicular to the substrate main surface. In contrast, light that has been incident on the substrate main body from a direction perpendicular thereto is reflected to the end face of the optical waveguide. Furthermore, according to the present invention, a plurality of surfaces, except the mirror surface, of the light-reflecting member may be in face-contact with the inner wall surfaces of the trench, and the mirror surface may be a side surface except the plurality of surfaces that are in face contact.

According to the present invention, there is provided an optical coupling component including a three-dimensional polyhedral light-reflecting member formed of an inorganic solid material and providing the optical coupling structure. The optical coupling component can further include a positioning member for positioning the level of the mirror surface of the light-reflecting member with respect to the optical axis of the optical waveguide.

Furthermore, according to the present invention, a method is provided for interfacing an optical waveguide of an optical transmission substrate that transmits an optical signal with the outside. First, a trench is formed, substantially perpendicular to the optical waveguide, in the main surface of the optical transmission substrate. An optical coupling unit including a three-dimensional polyhedral light-reflecting member formed of an inorganic solid material and having a mirror surface that obliquely intersects the optical axis of the optical waveguide is provided in the trench and in close contact with an end face of the optical waveguide. The above configuration allows the optical waveguide formed in the optical transmission substrate and the outside to easily be interfaced with each other.

According to the present invention, there is provided an optical interconnect system including the optical transmission substrate and an optical device disposed on the optical transmission substrate. In the optical interconnect system, the optical device on the substrate and the optical waveguide are connected through the mirror surface of the three-dimensional polyhedral light-reflecting member formed of an inorganic solid material. The above configuration can satisfactorily reduce a loss that can occur during optical data transmission, thereby achieve an optical data link among optical devices on the optical transmission substrate. Furthermore, if the mirror surface has concave portions corresponding to the cores of the optical waveguide, the spread of light that transmits optical signals is reduced, thus satisfactorily reducing crosstalk among the cores and a decrease in signal strength.

Optical printed circuit boards in which an optical wiring layer is formed on an electrical wiring board according to embodiments of the present invention are described hereinbelow as examples of the optical transmission substrate.

FIG. 1 shows the configuration of an optical printed circuit board 100 according to a first embodiment of the present invention. FIG. 1(A) is a top view of the optical printed circuit board 100; and FIG. 1(B) is a cross-sectional view of the optical printed circuit board 100 taken along line X shown in FIG. 1(A). The optical printed circuit board 100 shown in FIG. 1 includes an electrical wiring board 102 on which electrical wiring is provided and an optical wiring layer 106 formed on the electrical wiring board 102 so as to cover all or part thereof. The electrical wiring board 102 is what is called a multilayer printed circuit board (PCB) that transmits electric signals and electric power to electronic devices mounted on the optical printed circuit board 100.

The optical wiring layer 106 includes a core 108 that constitutes the channel of an optical waveguide and clad layers 104a and 104b that encloses the core 108. As shown in FIG. 1(A), the optical wiring layer 106 can include a plurality of cores 108. If the optical wiring layer 106 includes the plurality of cores 108, the clad layer 104 can be configured as a single clad layer that encloses the plurality of cores 108.

The optical wiring layer 106 including the cores 108 and the clad layer 104 is formed of a photosensitive organic polymeric material, such as polyimide resin, polyamide resin, polyether resin, or epoxy resin, by, for example, photolithography, on which optical wiring with a desired circuit pattern is defined. The cores 108 and the clad layer 104 are formed of materials with different refractive indexes.

Here, in the optical wiring layer 106, a portion defined, including a group of cores 108 indicated by the broken lines in FIG. 1(A), is referred to as a parallel optical waveguide 106a. The parallel optical waveguide 106a has a width L. The optical wiring layer 106 has a trench (groove) that is open, substantially perpendicular to the parallel optical waveguide 106a and vertically to the top surface of the electrical wiring board 102, in the path of the parallel optical waveguide 106a. In the optical printed circuit board 100 of this embodiment, an optical coupling component 110 is fitted in the trench. The optical coupling component 110 includes a mirror surface M that intersects the optical axes of the individual cores 108 of the parallel optical waveguide 106a at an inclination angle of substantially 45°. Thus, an optical coupling structure for interfacing the parallel optical waveguide 106a with the outside is provided.

With the optical printed circuit board 100 shown in FIG. 1, if a receiver or the like is disposed on the optical printed circuit board 100, light that is propagated in the cores 108 travels along an optical path B indicated by the dotted-chain line. Specifically, the light that is propagated in the individual cores 108 is incident on the mirror surface M at an incidence angle of 45°, where it is reflected at a right angle with respect to the optical axis of the parallel optical waveguide 106a and exits vertically from the top surface of the board 100 toward the outside. The light that exits to the outside enters the receiver or the like disposed on the optical printed circuit board 100 and is converted to an electric signal by a photoelectric transducer.

If a transmitter or the like is disposed on the optical printed circuit board 100, light that is vertically incident on the board 100 from the transmitter is incident on the mirror surface M at an incidence angle of 45°, where it is reflected at a right angle, is incident on the cores 108, and is propagated in the cores 108 in the reverse direction. In this manner, with the optical printed circuit board 100, the optical coupling structure provided by inserting the optical coupling component 110 into the trench allows an optical device disposed on the board, such as a receiver or a transmitter, and the parallel optical waveguide 106a of the board 100 to be interfaced with each other.

Figure 2:
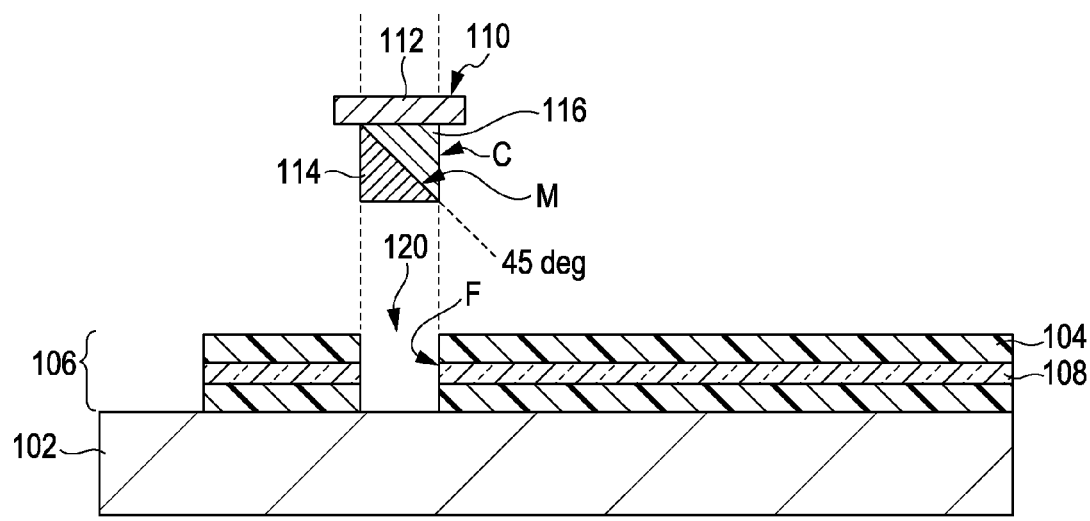
FIG. 2 is a cross-sectional view of the optical printed circuit board according to a first embodiment of the present invention before an optical coupling component 110 is fitted therein.

FIG. 2 shows a cross-sectional view of the optical printed circuit board 100 before the optical coupling component 110 is fitted therein. The cross-sectional view shown in FIG. 2 also corresponds to the line X shown in FIG. 1(A), as in FIG. 1(B). As shown in FIG. 2, the optical printed circuit board 100 has a trench 120 that opens in the surface of the board 100. The trench 120 includes, as an inner wall surface, a facetted end face F that is perpendicular to the parallel optical waveguide 106a and vertical to the optical axes of the cores 108 and to the top surface of the board 100. It is preferable that the other inner wall surfaces of the trench 120 be also formed vertically with respect to the main surface of the board 100 in view of forming a preferable optical coupling structure.

Although not particularly limited, the size of the trench 120 can be set at about 35 μm to 1 mm in the lateral direction of the cross section and at about several millimeters to several centimeters in width (corresponding to the width L of the parallel optical waveguide 106a) in correspondence with the array of the cores 108 included in the parallel optical waveguide 106a. The depth of the trench 120 can be set at a depth corresponding to the thickness of the optical wiring layer 106 and the depth of the cores 108 of the parallel optical waveguide 106a. In the embodiment shown in FIGS. 1 and 2, the trench 120 is configured such that the base thereof corresponds to the surface of the electrical wiring board 102. However, the trench 120 may be formed at a depth, for example, in the middle of the optical wiring layer 106 depending on the size of a light-reflecting member 114, to be described later, that provides the mirror surface M. The trench 120 is formed on the surface of the optical printed circuit board 100 by, for example, laser beam machining.

The optical coupling component 110 to be inserted into the trench 120 includes the light-reflecting member 114 that provides the mirror surface M, a connecting member 116, and a support plate 112. The connecting member 116 connects the cores 108, the mirror surface M, and the support plate 112 together to provide a medium that propagates light. The connecting member 116 attaches to the light-reflecting member 114 and has an outer wall surface C opposed to the above facetted end face F to fit the optical coupling component 110 in the trench 120. The support plate 112 provides a medium for propagating light together with the connecting member 116 and, in addition, functions as a positioning member that locates the optical coupling component 110 so that it is inserted to a predetermined depth at which the mirror surface M corresponds to the level of the cores 108 and is stopped. The connecting member 116 and the support plate 112 are formed of a light-transmissive organic polymeric material, as described above. When the optical coupling component 110 is fitted, a transparent resin adhesive is injected into the gap between the trench 120 and the optical coupling component 110 so that the optical coupling component 110 is secured in the trench 120.

The light-reflecting member 114 has a three-dimensional polyhedral shape, whose one surface serves as the mirror surface M. In a preferable embodiment, the light-reflecting member 114 can be substantially an isosceles right-angled triangular prism, as shown in FIG. 2. In this case, one side surface of the triangular prism including the base of the isosceles right-angled triangular cross section provides the mirror surface M. However, the three-dimensional polyhedron is not limited to the isosceles right-angled triangular prism but may be any three-dimensional polyhedron having a trapezoidal or a scalene triangular cross section and whose mirror surface M reflects light at an angle of 90° when disposed in the trench.

The following description is made on the assumption that the light-reflecting member 114 has an isosceles right-angled triangular shape.

In the optical coupling component 110, the mirror surface M is bonded to the connecting member 116 at an angle of substantially 45° with respect to the outer wall surface C and is adjusted so as to obliquely intersect the optical axes of the cores 108 of the parallel optical waveguide 106a at an inclination angle of substantially 45° when inserted into the trench 120. The length of the triangular prism of the light-reflecting member 114 preferably corresponds to the width of the trench 120 formed across the parallel optical waveguide 106a, and two sides of the cross section preferably correspond to the length of the short side of the base of the trench 120.

The mirror surface M of the light-reflecting member 114 can be flat over the surface, or alternatively, have spherical or aspherical concave portions corresponding to the individual cores 108 of the parallel optical waveguide 106a. If the mirror surface M of the light-reflecting member 114 has concave portions, light reflected by the mirror surface M is condensed, so that the spread of the light that transmits optical signals is satisfactorily reduced. The mirror surface M of the light-reflecting member 114 may be provided with a metal layer, such as gold or chromium, or a coating, such as a dielectric material, in advance.

The light-reflecting member 114 according to the embodiment of the present invention may be formed of a monocrystal silicon wafer. However, a material for forming the light-reflecting member 114 is not limited to the silicon wafer described above and may be a wafer-shaped crystalline or noncrystalline inorganic solid material having high processability, such as another silicon wafer, a GaAs wafer or another compound semiconductor wafer, an oxide monocrystal wafer, or a metal plate.

Figure 3:
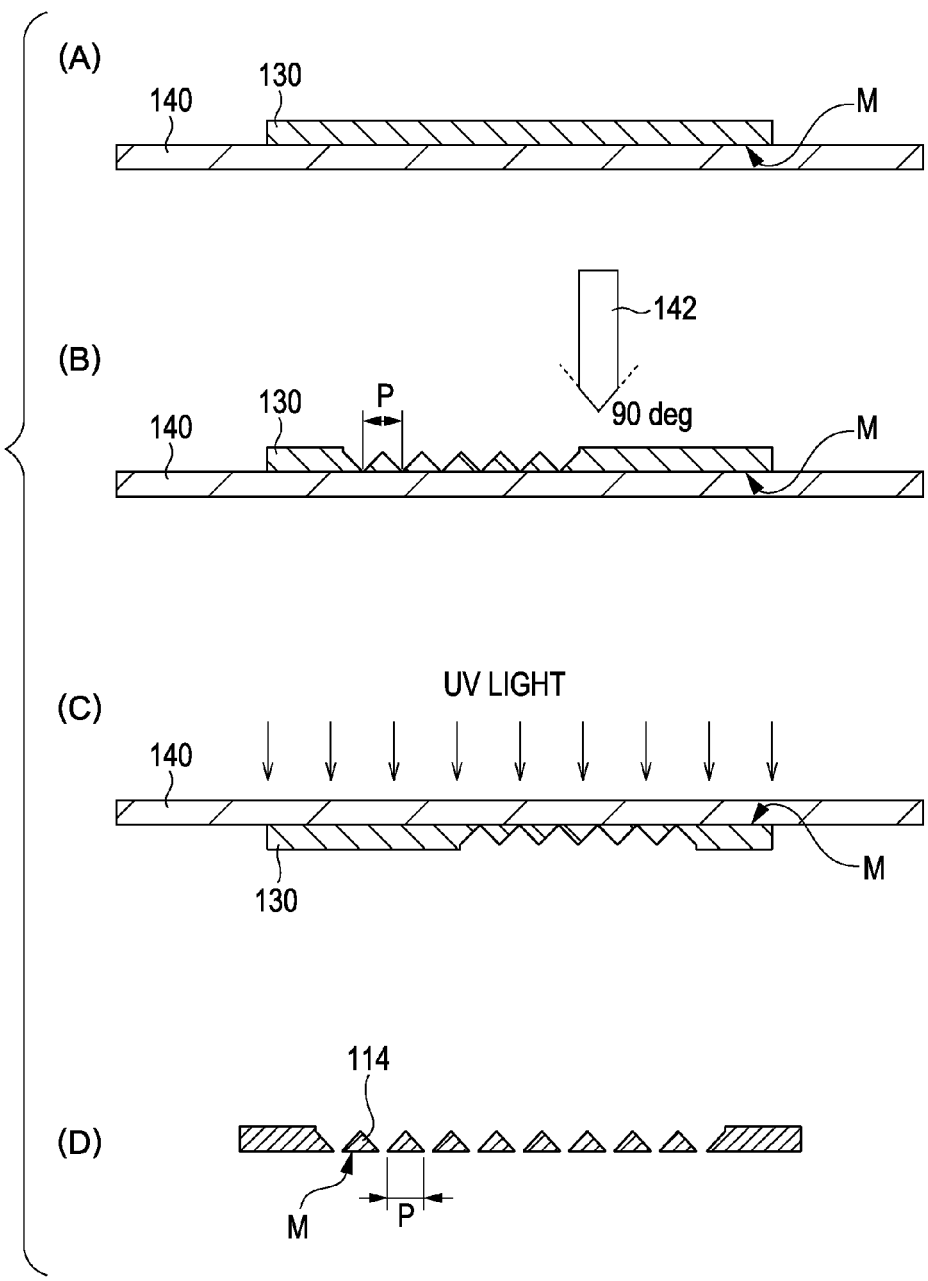
FIG. 3 shows a method for manufacturing a light-reflecting member of the optical coupling component according to an embodiment of the present invention, as well as the cross-sectional structures in the individual processes.
Figure 4:
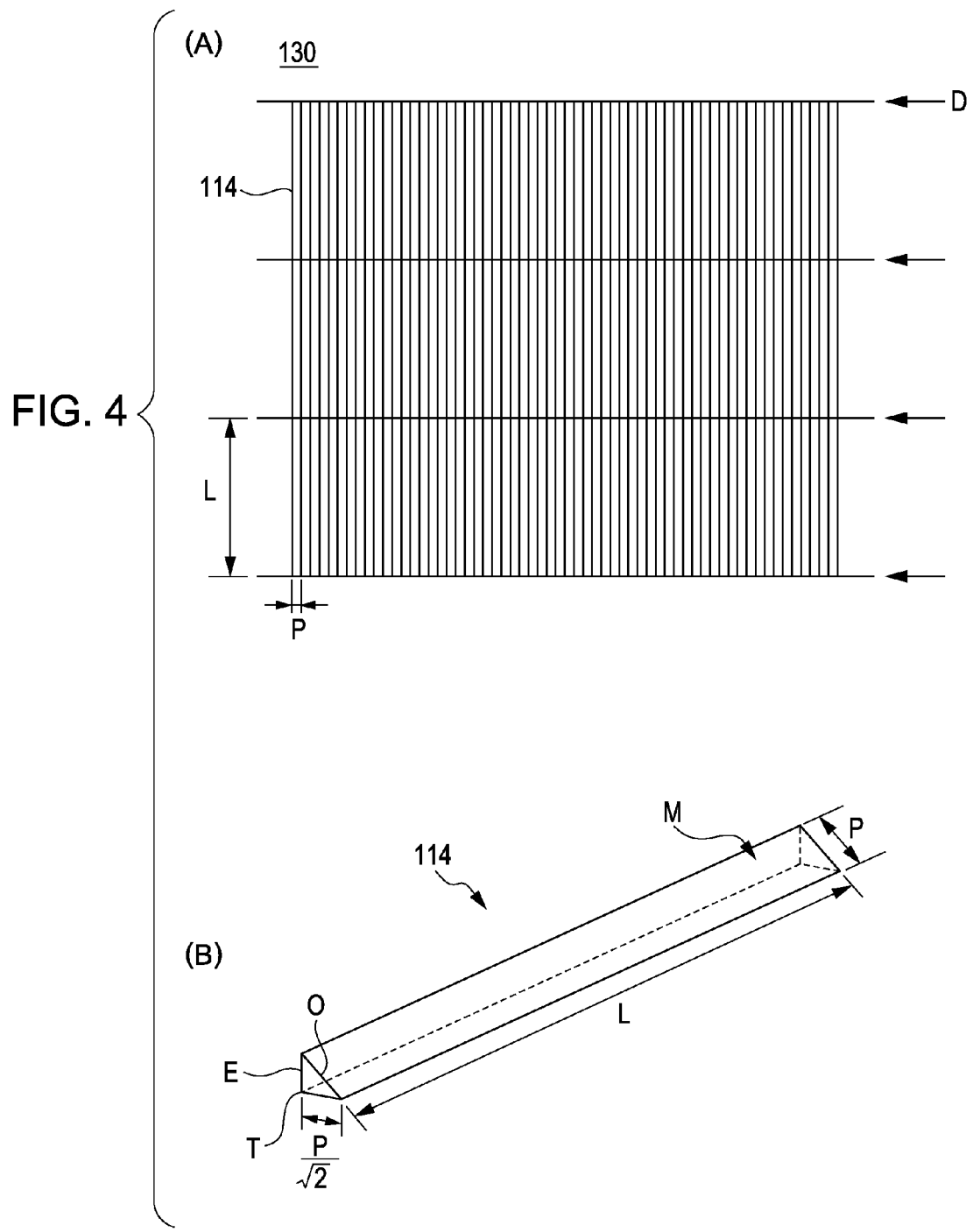
FIG. 4(A) is a schematic diagram of the back surface of a silicon wafer.
FIG. 4(B) is a perspective view of a light-reflecting member cut out from the silicon wafer.

Referring now to FIGS. 3 and 4, a method for manufacturing an optical coupling component according to an embodiment of the present invention will be described. FIGS. 3(A) to 3(D) are diagrams showing a method for manufacturing a light-reflecting member of the optical coupling component according to the embodiment of the present invention, as well as cross-sectional structures in the individual processes. Here, a case in which the light-reflecting member 114 is formed of a silicon wafer will be described by way of example.

Referring to FIG. 3(A), according to this manufacturing method, a silicon wafer 130 is mounted on a ring frame (not shown), with a dicing tape 140 therebetween. Here, the silicon wafer 130 is mounted on the dicing tape 140 so as to protect the surface of the silicon wafer 130, which used as the mirror surface M in the optical coupling component 110. The silicon wafer 130 prepared is reduced in thickness into a desired thickness by, for example, polishing the back surface in advance and has, for example, a thin wafer shape with a thickness of about 30 μm to 1 mm.

In the case where concave portions are formed on the mirror surface M of the light-reflecting member 114, the surface of the prepared silicon wafer 130 is provided with the concave portions in advance. In the case where a metal layer or a coating is formed on the mirror surface M of the light-reflecting member 114, the surface of the prepared silicon wafer 130 is provided with the metal layer by plating or vapor deposition or is provided with the coating, such as a dielectric material, in advance.

Referring to FIG. 3(B), according to the manufacturing method, the back surface of the silicon wafer 130 is then cut to form angled portions at a predetermined pitch interval P using a dicing blade 142 having a point angle of substantially 90°. This pitch interval P corresponds to the length of the opposite side of the isosceles right-angled triangle of the cross section of the light-reflecting member 114 and is set at a length of, for example, 50 μm to 1.4 mm depending on the shape of the parallel optical waveguide 106a on which the optical coupling component 110 is mounted. Also for the direction perpendicular to the angled-portion cutting direction, the silicon wafer 130 is cut at appropriate intervals corresponding to the width L of the parallel optical waveguide 106a by blade dicing or Stealth dicing before or after the step shown in FIG. 3(B).

FIG. 4(A) schematically shows the back surface of the silicon wafer 130 subjected to dicing. As shown in FIG. 4, the silicon wafer 130 is cut to form angled portions at the predetermined pitch interval P and is cut at a predetermined pitch L corresponding to the width L of the parallel optical waveguide 106a in a direction D perpendicular to the angled-portion cutting direction.

Referring to FIG. 3(C), according to the manufacturing method, next, ultraviolet light is radiated from the back of the dicing tape 140 to decrease the adhesiveness of the dicing tape 140, thereby stripping off the dicing tape 140 from the surface of the silicon wafer 130.

Referring to FIG. 3(D), according to the manufacturing method, next, the angled portions cut from the silicon wafer 130 are separated to obtain the plurality of light-reflecting members 114 having the shape of an isosceles right-angled triangular prism. At that time, the light-reflecting members 114 can be separated from on another by pressing a razor edge against the valleys of the angled portions. If an expanding dicing tape 140 is used, the silicon wafer 130 may be divided after dicing under the action of the dicing tape 140 expanded in the direction of the wafer surface.

FIG. 4(B) shows a perspective view of the light-reflecting member 114 cut out from the silicon wafer 130. As shown in 4(B), the obtained light-reflecting member 114 has the shape of substantially an isosceles right-angled triangular prism and has the mirror surface M having the length L and the width P, with the opposite side O of the vertex of the base (cross section) of the triangular prism as a short side. Since the surface of the silicon wafer 130 is normally polished into a mirror surface by chemical-mechanical polishing (CMP), significantly high flatness can be achieved. Since the manufacturing method according to the embodiment of the present invention provides, as the mirror surface M, a wafer surface that is not mechanically processed by a dicing blade etc., high reflection efficiency can be achieved. Furthermore, since the wafer surface can be provided with a metal layer or a coating in advance, higher reflection efficiency can be achieved.

The obtained light-reflecting member 114 is processed with high accuracy into a substantially isosceles right-angled triangular prism with a size specified by the pitch interval P and the pitch interval L set for the dicing. This makes it advantageous also in aligning the mirror surface M to a predetermined inclination angle with respect to the optical axis of the optical waveguide.

After the light-reflecting member 114 shown in FIG. 4(B) is obtained, the light-reflecting member 114 is disposed in an appropriate metal mold. The orientation of the mirror surface M is adjusted using, for example, an electrostatic holding device, the above-mentioned organic polymeric material is injected into the metal mold to embed the light-reflecting member 114 therein into the shape shown in FIGS. 1 and 2. As shown in FIG. 2, the modularized configuration of the optical coupling component 110 having a shape to be fitted in the trench 120 formed in the optical printed circuit board 100 facilitates the alignment of the optical axis of the optical waveguide and the mirror surface M during optical coupling.

Figure 5:
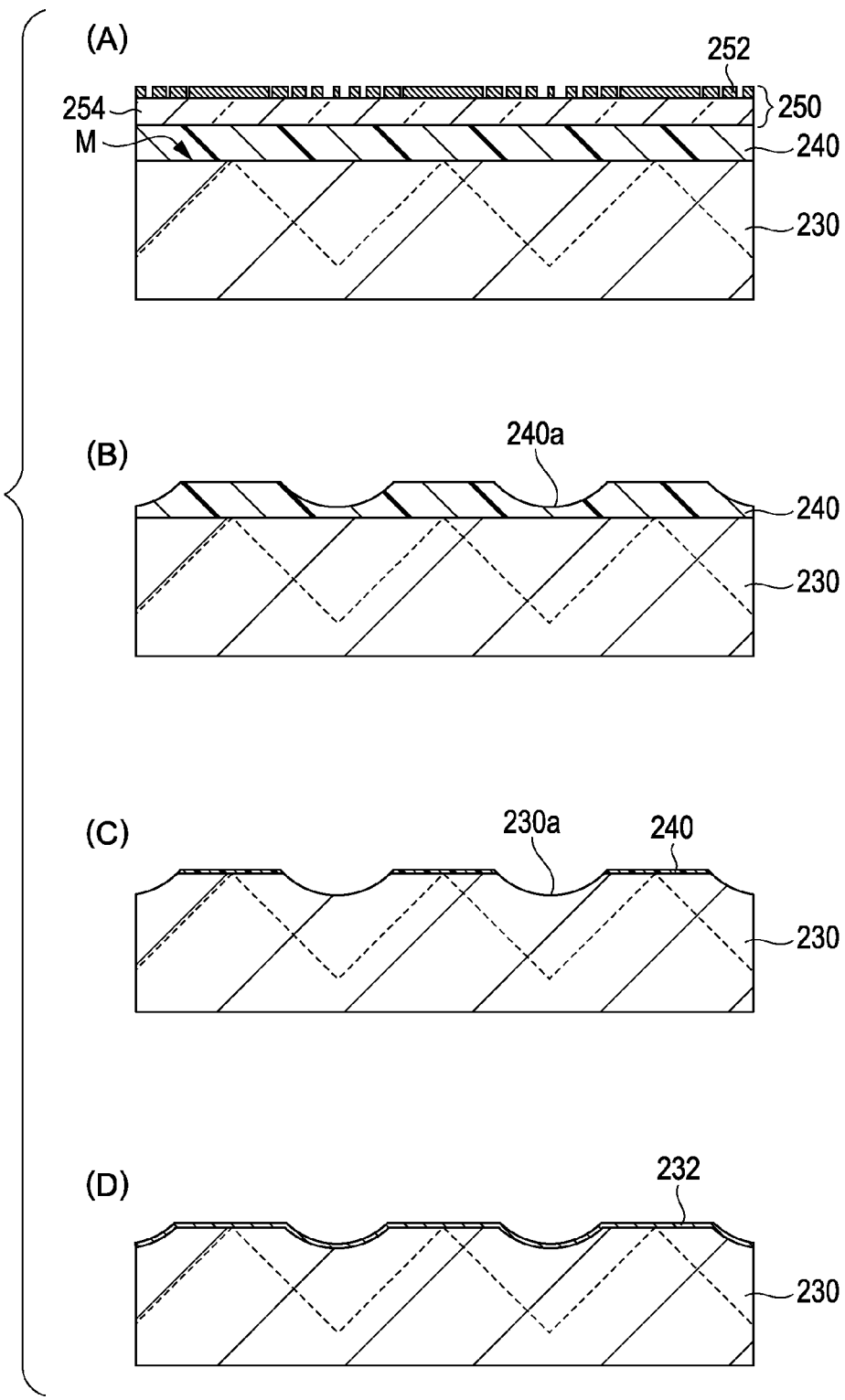
FIG. 5 shows an example of a method for forming a mirror surface having concave portions, as well as cross-sectional structures in the individual processes.

Referring now to FIG. 5, a method for forming the mirror surface M having concave portions is described. FIGS. 5(A) to 5(D) are diagrams showing an example of the method for forming the mirror surface M having concave portions, as well as cross-sectional structures in the individual processes. FIG. 5 shows a cut surface provided in the downstream process shown in FIG. 3(B) is indicated by a broken line. The forming method shown in FIG. 5 is performed before the silicon wafer 130 is mounted on the dicing tape 140 in FIG. 3(A). The processes shown in FIG. 5 are performed in alignment with substantially the angled pattern cut in the process shown in FIG. 3(B).

Referring to FIG. 5(A), according to the forming method, first, a positive resist film 240 is applied onto the surface of a silicon wafer 230, on which a grayscale mask 250 is disposed. The grayscale mask 250 includes a glass substrate 254 and a thin film 252 that is patterned on the glass substrate 254. The thin film 252 is patterned so as to form concaves at the positions of the mirror surfaces M intersecting the optical axes of the individual cores 108 of the parallel optical waveguide 106a when the light-reflecting member 114 is disposed in the trench 120.

Referring to FIG. 5(B), according to the forming method, the positive resist film 240 is exposed with light through the grayscale mask 250 for development. The intensity of exposure light is controlled according to the pattern of the thin film 252 of the grayscale mask 250, so that the positive resist film 240 is exposed to light into a shape corresponding to the concave portions. When the exposed resist film 240 is developed, portions exposed to light are removed to form concave portions 240a in the resist film 240 to become the state shown in FIG. 5(B).

Referring to FIG. 5(C), according to the forming method, the silicon wafer 230 is then subjected to isotropic dry etching together with the developed resist film 240 by dry etching using plasma etching gas. By the dry etching, the concave portions 240a formed in the resist film 240 is transferred to the silicon wafer 230 to form concave portions 230a on the surface of the silicon wafer 230.

Referring to FIG. 5(D), according to the forming method, the remaining resist film 240 is then removed. A metal layer of chromium or gold is evaporated onto the surface of the silicon wafer 230 on which the concave portions 230a are formed or a coating is formed by spin coating or the like to form a reflection improved layer 232. After the forming method shown in FIG. 5 is performed, the silicon wafer 230 is mounted on the dicing tape 140 in alignment with the pattern of the concave portions 230a in FIG. 3(A), and the processes shown in FIGS. 3(B) to 3(D) are performed.

The method for forming the mirror surface M having the concave portions is not limited to the embodiment shown in FIG. 5. In another embodiment, for example, a negative resist film may be used instead of the positive resist film 240. In yet another embodiment, concave portions, as shown in FIG. 5(B), may be formed on the resist film 240 by pressing a metal mold having desired concave portions, instead of the grayscale mask 250, against the resist film 240.

Figure 6:
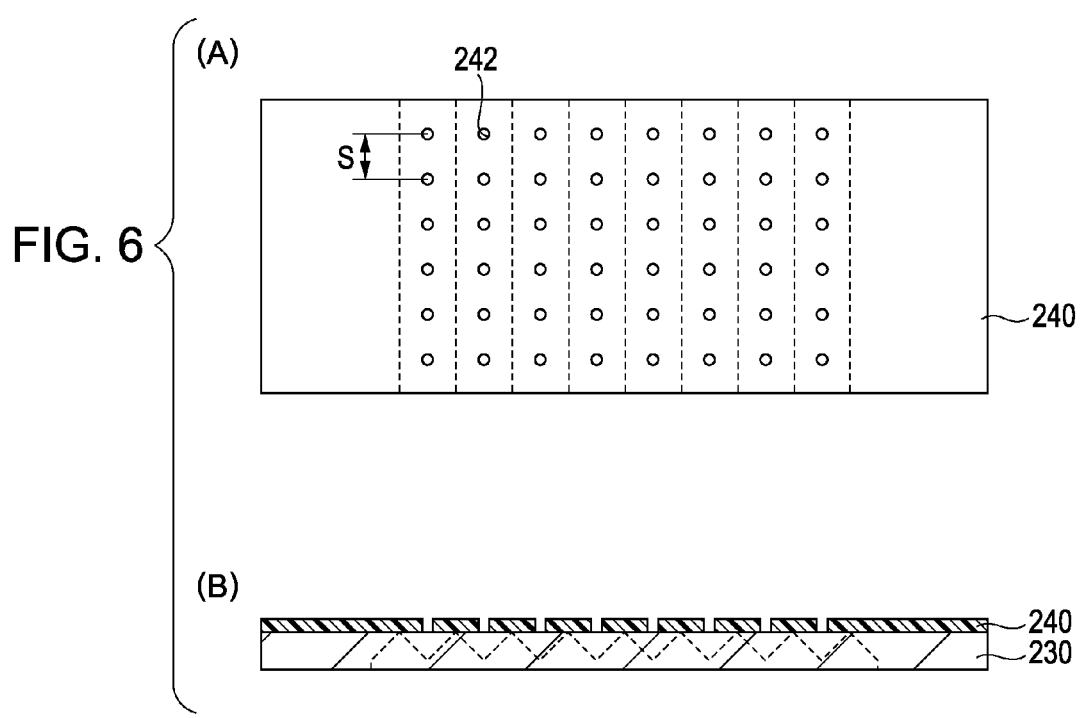
FIG. 6 shows a method for forming a mirror surface M having concave portions according to an embodiment that uses the liquid etching agent.

In still another embodiment, desired concave portions can be formed on the surface of the silicon wafer 230 by forming openings at locations of the resist film 240 corresponding to the centers of individual concave portions and performing anisotropic wet etching using a liquid etching agent through the openings. FIG. 6 is a diagram showing a method for forming the mirror surface M having concave portions according to the embodiment that uses the liquid etching agent. FIG. 6(A) shows a top view of the resist film 240; and FIG. 6(B) shows a cross-sectional view thereof.

Referring to FIGS. 6(A) and 6(B), according to the forming method of the other embodiment, openings 242 are formed at the locations corresponding to the concave portions of the resist film 240 by lithography. The openings 242 are formed at substantially the centers of regions corresponding to the mirror-surface reflecting members at a predetermined pitch interval S. The pitch interval S corresponds to the pitch interval between the cores 108 included in the parallel optical waveguide 106a. By performing anisotropic wet etching on the surface of the silicon wafer 230 using the etching mask shown in FIGS. 6(A) and 6(B), desired concave portions can be formed on the surface.

The concave portions formed on the mirror surface M by the above-described forming method function as concave mirrors to satisfactorily reduce the spread of light reflected by the mirror surface M. As described above, the method for manufacturing the optical coupling component according to the embodiment of the present invention allows the wafer surface to be used as the mirror surface M. The portions formed on the wafer surface, such as concave portions, can be formed in accurate alignment with the cutting pattern of the back surface of the wafer. Thus, it can be said that this manufacturing method is advantageous in terms of forming a mirror surface having concave portions corresponding to the cores of the optical waveguide.

Figure 7:
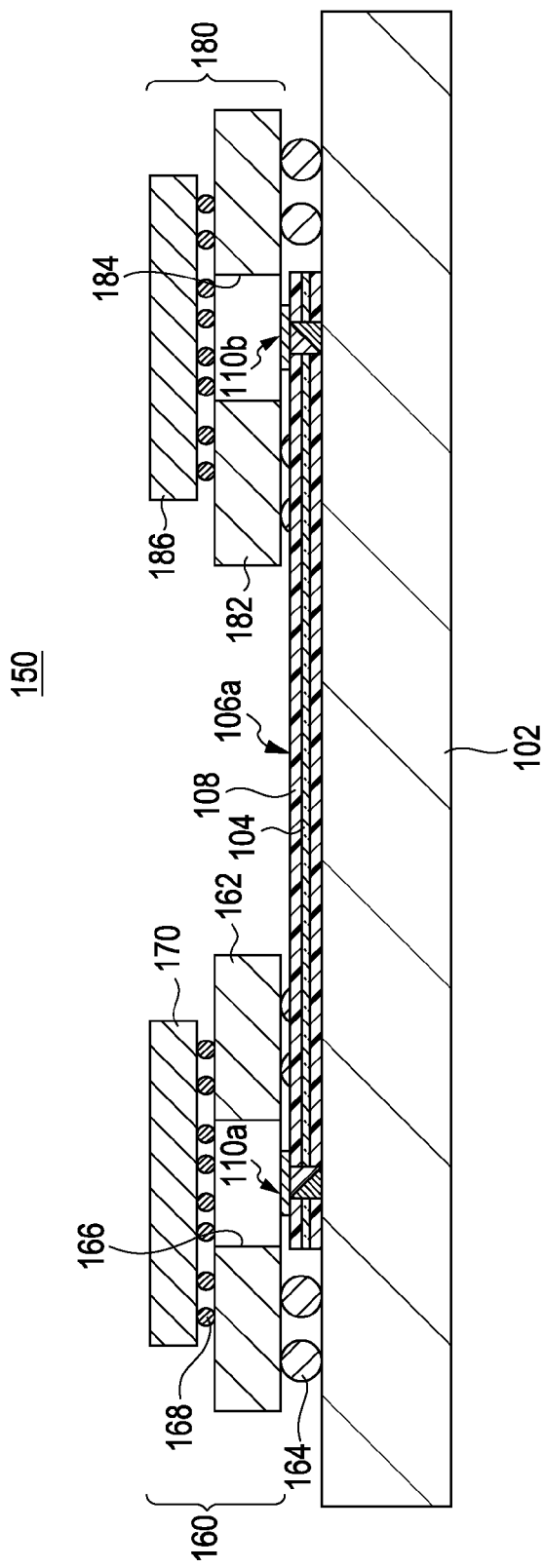
FIG. 7 shows an optical interconnect system including the optical printed circuit board according to the first embodiment of the present invention.

Referring to FIG. 7, an optical interconnect system using the optical printed circuit board according to the first embodiment of the present invention will be described hereinbelow. FIG. 7 shows an optical interconnect system 150 including the optical printed circuit board 102 according to the first embodiment of the present invention. The optical interconnect system 150 shown in FIG. 7 includes the electrical wiring board 102 and the parallel optical waveguide 106a defined on the optical wiring layer 106. The electrical wiring board 102 has an optical transmitter chip module 160 and an optical receiver chip module 180 mounted thereon. The parallel optical waveguide 106a has optical coupling components 110a and 110b fitted in two trenches formed at both end portions, respectively.

The optical transmitter chip module 160 includes a carrier 162 mounted on the electrical wiring board 102, with solder bumps 164 therebetween, and an LDD (laser diode driver) array IC 170 mounted on the carrier 162, with solder bumps 168 therebetween. The carrier 162 has an optical component 166 including a lens array and a VCSEL (vertical cavity surface emitting laser) array. The VCSEL array is driven by the LDD ARRAY IC 170 to introduce optical signals of the individual channels into the cores 108 in the parallel optical waveguide 106a through the optical coupling component 110a.

The optical receiver chip module 180 includes a carrier 182 mounted on the electrical wiring board 102, with solder bumps therebetween, and a TIA (transimpedance-amplifier) array IC 186 mounted on the carrier 182, with solder bumps therebetween. The carrier 182 has an optical component 184 including a lens array and a PD (photo diode) array. When optical signals through the individual channels are introduced into the individual channels of the PD array through the optical coupling component 110b, the TIA array IC 186 converts the optical signals input from the PD array to electric signals.

In this manner, in the optical interconnect system 150 shown in FIG. 7, optical devices mounted on the board 102, such as the optical transmitter chip module 160 and the optical receiver chip module 180, are interfaced with the parallel optical waveguide 106a using the optical coupling components 110a and 110b to achieve an optical data link between the optical devices. As has been described, the mirror surface M of the optical coupling component 110 according to the embodiment of the present invention has high flatness, thereby allowing a loss that could be generated during optical data transmission to be reduced satisfactorily. Furthermore, if the mirror surface M has the concave portions corresponding to the cores 108 of the parallel optical waveguide 106a, the spread of light that transmits signals can be satisfactorily reduced, thus satisfactorily reducing crosstalk between the cores 108 and a decrease in the intensity of the signals.

Figure 8:
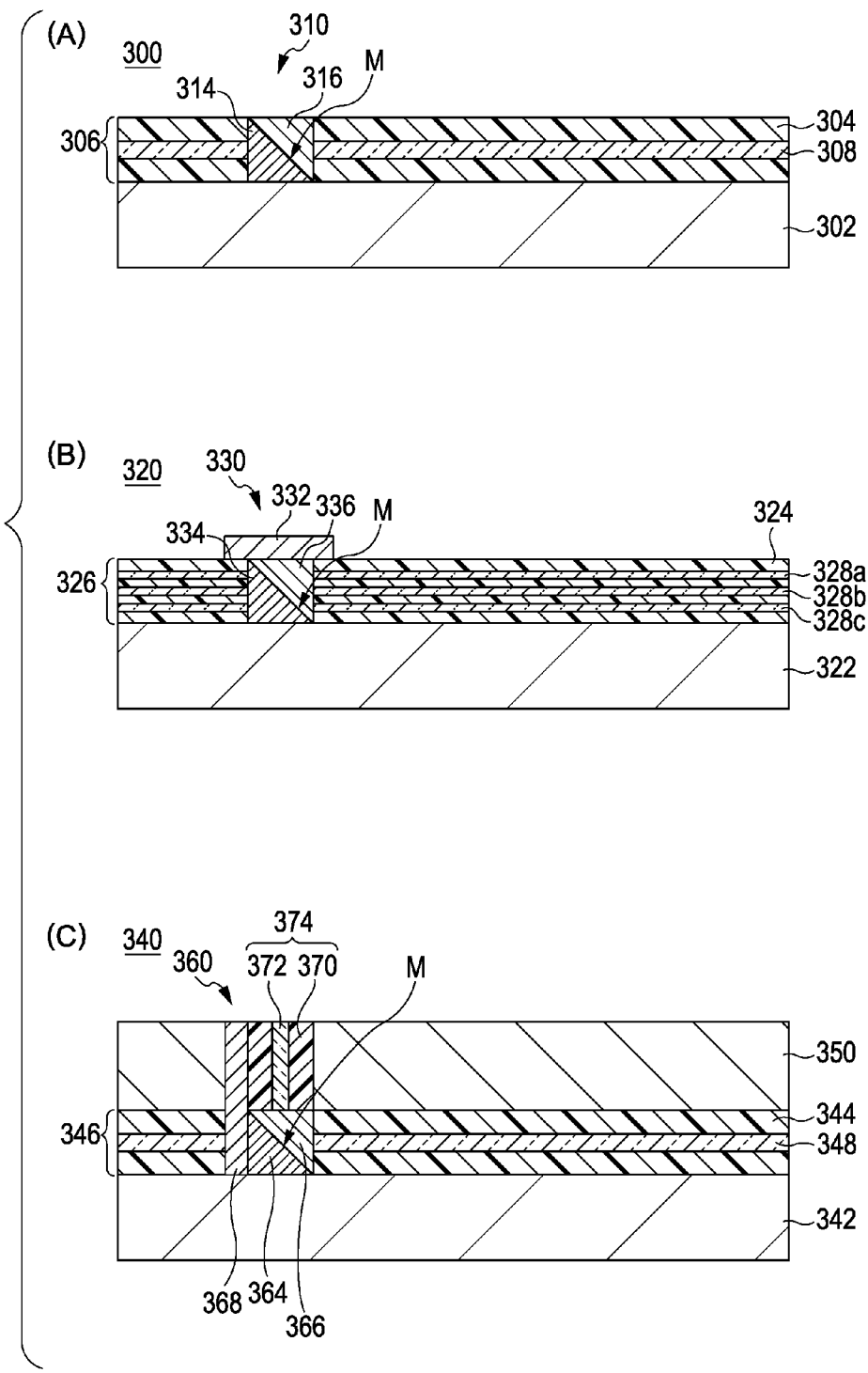
FIG. 8 shows the configurations of optical printed circuit boards according to other embodiments of the present invention.
Figure 9:
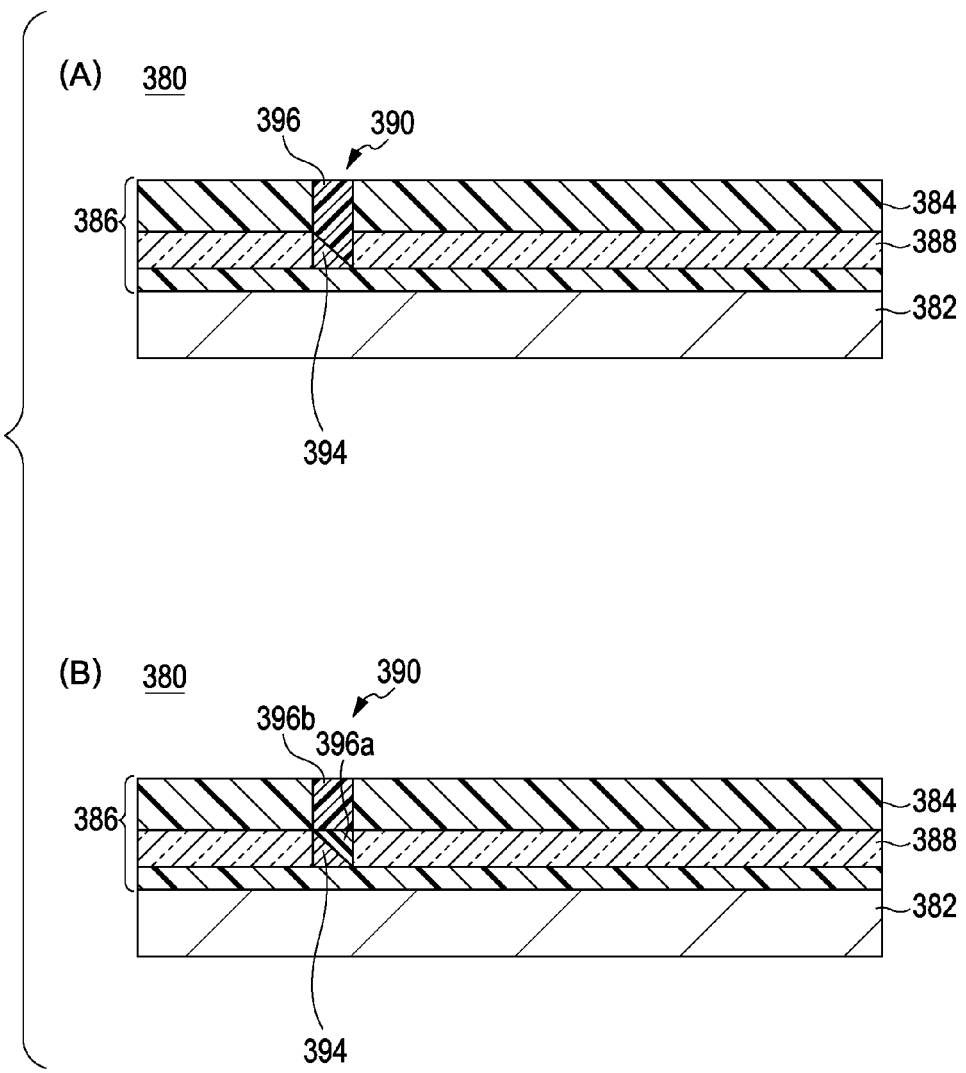
FIG. 9 is a diagram showing the configuration of an optical printed circuit board according to still another embodiment of the present invention.

Referring now to FIGS. 8 and 9, optical coupling structures according to other embodiments of the present invention are described. FIG. 8 shows the configurations of optical printed circuit boards according to other embodiments of the present invention. Since the optical printed circuit boards 300, 320, and 340 shown in FIG. 8 have configurations similar to that shown in FIG. 1, differences will be mainly described hereinbelow. The cross-sectional views shown in FIG. 8 are taken along a line that vertically crosses the cores of the optical waveguides, as is the cross-sectional view shown in FIG. 1.

FIG. 8(A) is a cross-sectional view of the optical printed circuit board 300 according to a second embodiment of the present invention. The optical printed circuit board 300 shown in FIG. 8(A) includes an electrical wiring board 302 and an optical wiring layer 306 constituted of cores 308 and a clad layer 304.

In the embodiment shown in FIG. 8(A), an optical coupling structure for interfacing between the parallel optical waveguide and the outside is not achieved by a modularized optical coupling component as in the first embodiment. Instead, in the embodiment shown in FIG. 8(A), a light-reflecting member 314 similar to that of the first embodiment is disposed in a trench that opens in the path of the parallel optical waveguide, and the interior of the trench is filled with a transparent polymeric resin material 316 or the like to constitute an optical coupling component 310. The light-reflecting member 314 is fitted in the trench so that the mirror surface M of the light-reflecting member 314 obliquely intersects the optical axes of the cores 308 of the parallel optical waveguide at an inclination angle of substantially 45° and is secured with the polymeric resin material 316.

Also in the optical printed circuit board 300 shown in FIG. 8(A), light that has traveled in the individual cores 308 toward the end face is reflected by the mirror surface M at a right angle to the optical axis of the parallel optical waveguide and exits vertically from the top surface of the board 300 toward the outside. In contrast, light that has been incident on the board 300 perpendicular thereto is reflected at a right angle by the mirror surface M into the cores 308 and is propagated in the reverse direction. In this manner, with the optical printed circuit board 300 shown in FIG. 8(A), external optical devices, such as a receiver or a transmitter, disposed on the board 300 and the parallel optical waveguide of the board 300 are interfaced with each other using the optical coupling structure provided by the light-reflecting member 314 secured in the trench with the polymeric resin material 316. The configuration shown in FIG. 8(A) can be used in the case where there is no need to modularize the light-reflecting member 314 as an optical coupling component.

FIG. 8(B) is a cross-sectional view of the optical printed circuit board 320 according to a third embodiment of the present invention. In the optical printed circuit board 320 shown in FIG. 8(B), an optical wiring layer 326 is constituted of cores 328a, 328b, and 328c arrayed in layers and a clad layer 324.

An optical coupling component 330 includes a light-reflecting member 334 having a mirror surface M of a size corresponding to the array of the multilayered cores 328. Thus, also with a multilayered optical waveguide, as shown in FIG. 8(B), optical signals transmitted through a plurality of channels of the cores 328 are reflected substantially at a right angle by the mirror surface M and are introduced into optical devices mounted on the board 320. Alternatively, optical signals emitted from optical devices mounted on the board 320 are reflected substantially at a right angle by the mirror surface M and are introduced into the individual cores 328.

FIG. 8(C) is a cross-sectional view of the optical printed circuit board 340 according to a fourth embodiment of the present invention. The optical printed circuit board 340 shown in FIG. 8(C) further includes an upper substrate layer 350 formed on a first optical wiring layer 346. A trench is formed vertically from the surface of the optical printed circuit board 340 through the upper substrate layer 350 and the first optical wiring layer 346 to reach a lower substrate 342. An optical coupling component 360 including a light-reflecting member 364 is embedded in the trench.

The optical coupling component 360 shown in FIG. 8(C) includes a support substrate 368, a light-reflecting member 364 and a second optical wiring layer 374 secured on the support substrate 368, and a connecting member 366 that bonds the light-reflecting member 364 and the second optical wiring layer 374. The second optical wiring layer 374 includes a plurality of cores 372 corresponding to the individual cores 348 of the parallel optical waveguide of the first optical wiring layer 346 formed in the board 340. A clad layer 370 of the second optical wiring layer 374 is formed to enclose the cores 372. In the embodiment shown in FIG. 8(C), an end of the support substrate 368 is in contact with the base of the trench to serve as a positioning member for positioning the level of the mirror surface M.

With the optical coupling component 360 shown in FIG. 8(C), the interface between the optical waveguide of the second optical wiring layer 374 formed in the substrate and the outside is achieved. While the optical path length increases with the thickness of the upper substrate layer 350, the intervals corresponding to the thickness of the upper substrate layer 350 are coupled by the second optical wiring layer 374. This can satisfactorily prevent a decrease in coupling efficiency due to light diffusion caused from an increase in optical path length. Moreover, since the second optical wiring layer 374 can be formed in the board 340, an increase in the temperature of the optical waveguide during the manufacturing process can be reduced as compared with a case in which the optical wiring layer is formed on the surface of the board. This improves the thermal resistance of the optical printed circuit board 340.

FIG. 9 is a diagram showing the configuration of an optical printed circuit board according to still another embodiment of the present invention. FIG. 9(A) is a cross-sectional view of an optical printed circuit board 380 according to a fifth embodiment of the present invention. The optical printed circuit board 380 shown in FIG. 9(A) includes an electrical wiring board 382 and an optical wiring layer 386 constituted of cores 388 having a square cross section and a clad layer 384. The optical printed circuit board 380 shown in FIG. 9(A) is an embodiment in which a trench that opens to the surface of the board 380 is formed in correspondence with one square cross-section core of the optical waveguide.

In the embodiment shown in FIG. 9(A), an optical coupling structure for interfacing between the optical waveguide and the outside is provided by an optical coupling component 390 including a light-reflecting member 394 disposed in the trench, as in the second embodiment. The trench has a depth corresponding to the level of the lower ends of the cores 388 and a width equal to the widths of the square cross sections of the cores 388 of the optical waveguide and opens in a square shape as viewed from the front surface. The light-reflecting member 394 disposed in the trench has a length corresponding to the width of the trench and a size corresponding to the cores 388. The light-reflecting member 394 is fitted in the trench so that the mirror surface thereof obliquely intersects the optical axes of the cores 388 of the optical waveguide at an inclination angle of substantially 45° and is secured with a polymeric resin material 396. In this embodiment, an optical waveguide configuration can be formed also in the vertical direction (vertical optical waveguide configuration) by setting the light refractive index of the polymeric resin material 396 injected into the trench equal to or higher than that of the cores 388 of the optical waveguide.

FIG. 9(B) shows a modification of the fifth embodiment of the present invention. In the modification shown in FIG. 9(B), the polymeric resin material 396 of the optical coupling component 390 is constituted of two portions 396*a* and 396*b* having different refractive indexes. In this modification, the refractive index of the polymeric resin portion 396*a* that is in contact with the light-reflecting member 394 should be equal to, or preferably, slightly higher than that of the cores 388 of the optical waveguide formed in the board 380. In other words, it is preferable that the conditions of the refractive indexes, $n2 \leq n3 \leq n2^2/n1$ and $n2 \leq n4 \leq n2^2/n1$, be satisfied, where n1 is the refractive index of the clad layer 384, n2 is the refractive index of the cores 388, and n3 and n4 are refractive indexes of the polymeric resin portions 396*a* and 396*b*, respectively.

In particular, setting the refractive index n3 of the portion 396*a* whose cross section is an isosceles right-angled triangle, which is in contact with the light-reflecting member 394, higher than the refractive index n2 of the cores 384 provides a light confining effect, thus satisfactorily reducing a loss in the optical coupling component 390. The light confining effect occurs even in the vicinity of the reflecting portion, The above description is made, with reference to FIG. 9(A), about the case where the light-reflecting member 394 is fitted in the trench and is secured with the polymeric resin material 396 to thereby form the optical coupling component 390. However, also in the fifth embodiment having the vertical optical waveguide configuration, the optical coupling component may be modularized into a shape that is fitted in the trench, as in the first embodiment. In this case, the vertical optical waveguide configuration may also be formed in correspondence with the individual cores in the parallel optical waveguide.

With the optical printed circuit board according to the embodiments of the present invention described above, the surface of the wafer, which is polished into a mirror surface by CMP processing, can be used as the mirror surface M that allows interfacing with the outside without mechanical processing using a dicing blade or the like. This allows a mirror surface having high flatness and high reflectance to be easily obtained as compared with the method for forming an inclined reflecting surface by laser beam machining of the related art and can achieve high optical coupling efficiency. Furthermore, since the mirror surface M can easily be provided with a metal layer or a coating in advance, the reflectance can easily be improved.

The optical coupling structure according to an embodiment of the present invention is described more specifically using an example. However, the present invention is not limited to a specific example.

Example

Manufacturing Light-Reflecting Member

A 1500 Å of gold or chromium metal layer was evaporated on the surface of a silicon wafer (made by Enatek, Ltd.) with a thickness of about 70 µm and a diameter of 4 inches.

The prepared silicon wafer was bonded on a dicing tape of an ultraviolet off type, with the surface up, and was mounted on a ring frame. Subsequently, the silicon wafer was cut at a pitch interval P of 100 µm from the back using a diamond blade having a 90° point angle (made by DISCO Corporation) to form angled portions in a pattern shown, in outline, in FIG. 4(A) and was further cut at a pitch interval L of 5 mm in the direction perpendicular to the angled portions using a dicing blade. Subsequently, ultraviolet light was radiated from the back of the dicing tape to strip off the dicing tape from the surface of the silicon wafer.

FIG. 10(A) is a picture showing the appearance of the diced silicon wafer. FIG. 10(A) shows a cut portion at substantially the center of the silicon wafer. FIG. 10(B) is a diagram showing the appearance of the cut portion of the back surface of the wafer (cut surface) observed by a profile measurement microscope (made by Keyence Corporation, type number: VK-8550) and a profile (referred to H in the drawing) obtained by measuring the height of the back surface of the wafer. As shown in FIG. 10(B), a profile showing good angled portions was obtained. FIG. 10(C) shows a single rod-like silicon mirror that is obtained by cutting out a necessary length of silicon wafer in the direction perpendicular to the first dicing in the bonded state after the measurement in FIG. 10(B).

Figure 11:
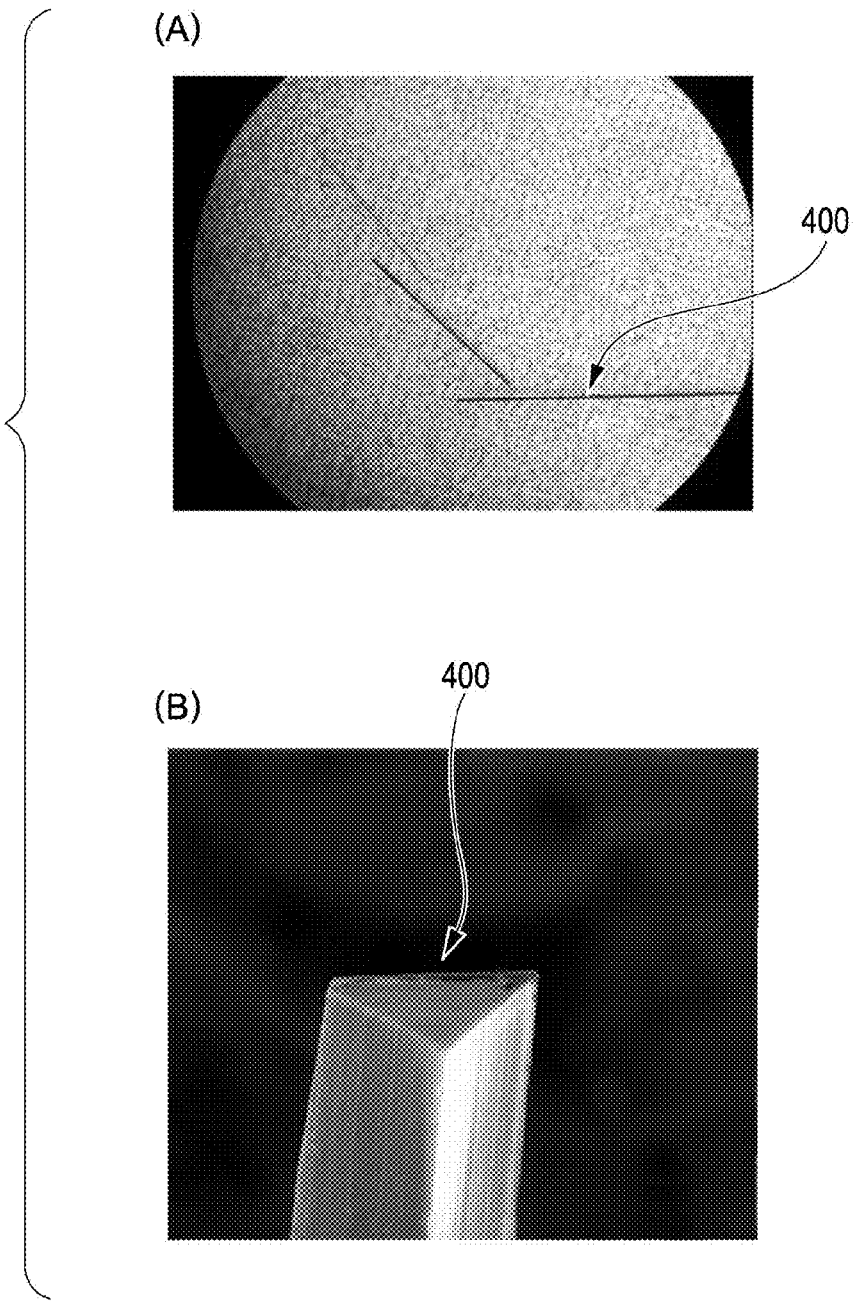
FIG. 11(A) shows an optical microscopic image of silicon mirrors.
FIG. 11(B) shows a microscopic image of an end of the silicon mirror.

Subsequently, a razor was pressed against the individual valleys between the angled portions formed on the back surface of the wafer in registration therewith to separate the angled portions into a plurality of substantially isosceles right-angled triangular prism silicon mirrors. FIG. 11(A) shows an optical microscopic image of the obtained silicon mirrors 400. FIG. 11(B) shows a microscopic image of an end of the obtained silicon mirror 400. As shown in FIG. 11(B), it was confirmed that the silicon mirror 400 has the shape of a substantially isosceles right-angled triangular prism having preferable cut surfaces.

(Forming Optical Coupling Structure)

The obtained silicon mirror 400 was handled using an electrostatic holding device shown in FIG. 12(A) under a microscope and was fitted in a trench formed in a 100-µm thick resin layer, prepared as dummy, on the silicon substrate. FIG. 12(A) is a diagram showing, in outline, the electrostatic holding device used for handling the silicon mirror. As shown in FIG. 12(A), high voltage was applied between two holding plates 410*a* and 410*b*, that is, two metal plate electrodes coated with an insulator (polyimide), to hold the silicon mirror 400 in a contact manner at the tips of the holding plates 410*a* and 410*b* using an electrostatic attracting force. FIG. 12(B) is a picture showing the silicon mirror 400 electrostatically attracted to the tips of the electrostatic holding device.

Figure 13:
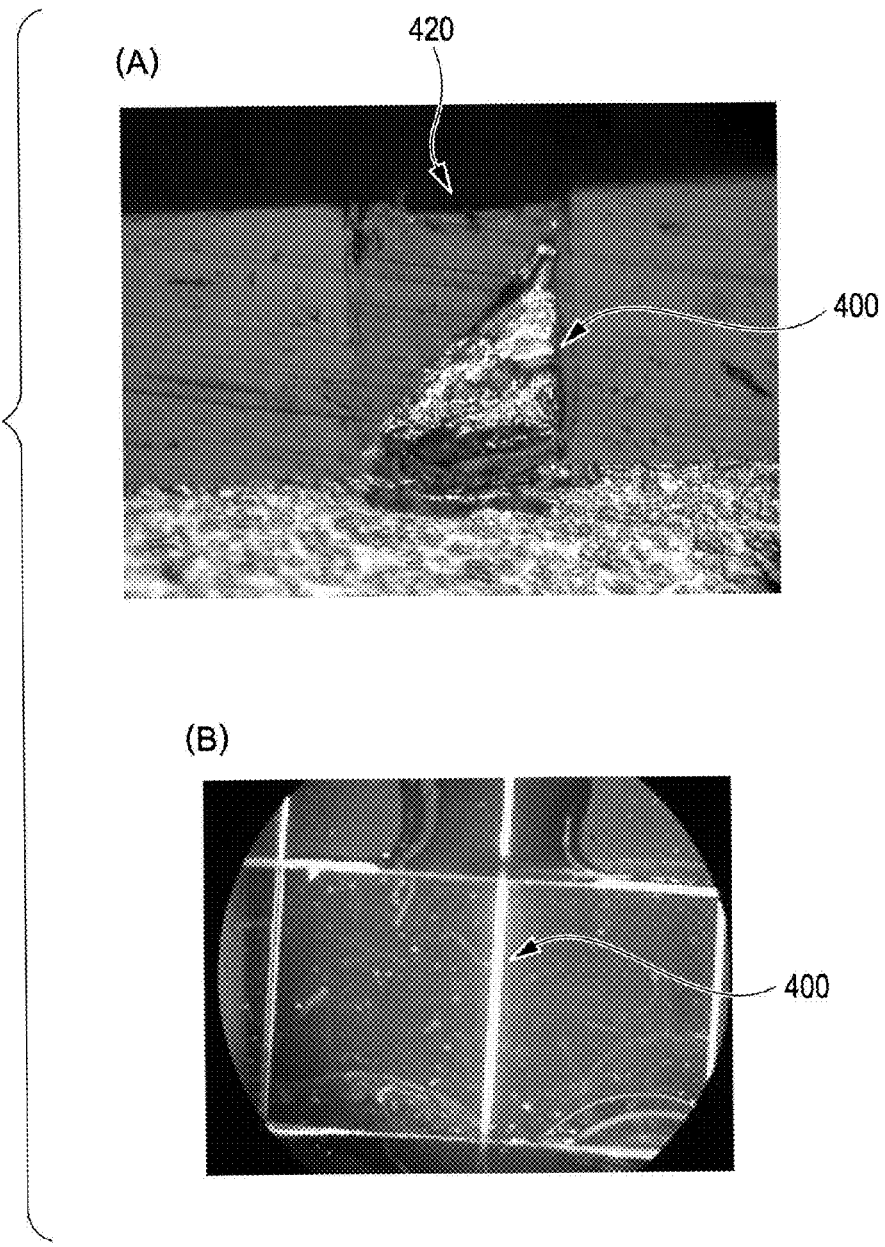
FIG. 13(A) is a picture of the cross section of a manufactured optical coupling structure.
FIG. 13(B) is a picture of the board taken from the top thereof substantially perpendicular thereto.
Figure 14:
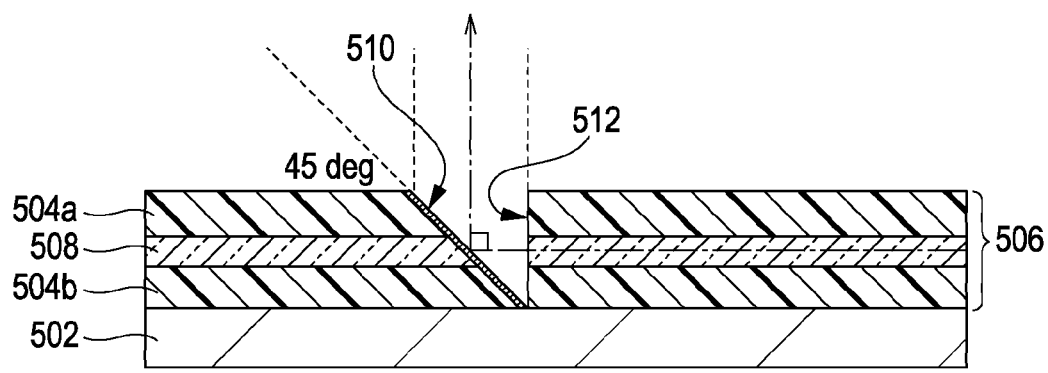
FIG. 14 is a cross sectional view showing an optical coupling structure for an optical waveguide and the outside according to related art.

Subsequently, a transparent ultraviolet cure resin 420 (made of Kyoritsu Chemical & Co. Ltd.) was injected into the trench to harden the resin by radiating light, thereby securing the silicon mirror 400 fitted in the trench in the trench. FIG. 13(A) is a picture of the cross section of an optical coupling structure formed when the silicon mirror 400 is secured in the trench with the transparent resin 420. FIG. 13(A) shows the silicon mirror 400 secured in the trench with the resin 420. FIG. 13(B) shows a picture of the board taken from the top thereof substantially perpendicular thereto while radiating light from the side of the board. As shown in FIG. 13(B), light radiated from the side of the board was reflected by the silicon mirror 400.

The example shows that an optical coupling structure that interfaces with the outside can be configured by using a silicon mirror cut from a wafer as a light-reflecting member, with the surface of the wafer on which a metal layer is formed as a mirror surface, and disposing the silicon mirror in a trench provided in a light transmitting layer.

Although the present invention has been described with reference to specific embodiments, it is to be understood that the invention is not limited to the foregoing embodiments. Modifications, other embodiments, additions, changes, and deletions may be made within the scope in which those skilled in the art can consider and such modifications are included in the scope of the invention as defined in the following claims.

What is claimed is:

1. An optical transmission substrate that transmits an optical signal, the optical transmission substrate having a main surface and comprising:
    an optical waveguide;
    two clad layers for enclosing the optical waveguide there between; and
    an optical coupling unit provided in a trench that opens in the main surface of the substrate, substantially perpendicular to the optical waveguide and in close contact with an end face of the optical waveguide, a depth of the trench spanning from the main surface of the substrate and through an entirety of the depths of the optical waveguide and the two clad layers;
    wherein said optical coupling unit includes a three-dimensional polyhedral light-reflecting member formed of a monocrystal inorganic solid non-metal wafer and having a mirror surface that obliquely intersects the optical axis of the optical waveguide to provide the optical transmission substrate with a structure for optical coupling with the outside,
    wherein a width of the three-dimensional polyhedral light-reflecting member corresponds to a width of the trench, and a depth of the three dimensional polyhedral light-reflecting member corresponds to an entirety of the depth of the trench, and
    wherein the three-dimensional polyhedral light-reflecting member has a scalene triangular cross section, and a plurality of surfaces, other than the mirror surface, of the three-dimensional polyhedral light-reflecting member are in face-contact with the inner wall surfaces of the trench.

2. The optical transmission substrate according to claim 1, wherein:
    the trench has an inner wall surface that is substantially perpendicular to the substrate main surface; and
    the optical coupling unit is formed in such a manner that an optical coupling component formed in a shape to be fitted in the trench is inserted into the trench.

3. The optical transmission substrate according to claim 2, wherein the mirror surface has concave portions corresponding to the channels of the optical waveguide.

4. The optical transmission substrate according to claim 3, wherein the optical coupling unit has, in correspondence with the channels of the optical waveguide, a vertical optical waveguide structure formed of a material having a light refractive index higher than or equal to the light refractive index of the material of the cores of the optical waveguide.

5. The optical transmission substrate according to claim 1, wherein:
    a plurality of surfaces, other than the minor surface, of the light-reflecting member are in face-contact with the inner wall surfaces of the trench; and
    the mirror surface is a side surface other than the plurality of surfaces that are in face contact.

6. The optical transmission substrate according to claim 1, wherein:
    the optical coupling unit was formed by inserting an optical coupling component formed in a shape to be fitted in the trench into the trench and includes the three-dimensional polyhedral light-reflecting member having the mirror surface that obliquely intersects the optical axis of the optical waveguide to provide the optical transmission substrate with a structure for optical coupling with the outside;
    the light-reflecting member is configured such that the three-dimensional polyhedron is a triangular prism that is cut off from the wafer, with a surface of the wafer served as the mirror surface, a plurality of surfaces, except the mirror surface is in face-contact with the inner wall surfaces of the trench; and
    the mirror surface (i) is provided as a surface of the three-dimensional polyhedron, (ii) has concave portions corresponding to the channels of the optical waveguide and (iii) reflects light emitted from the end face of the optical waveguide in a direction intersecting the substrate main surface or reflects incident light through the substrate main surface toward the end face of the optical waveguide.

7. The optical transmission substrate according to claim 1, wherein the depth of the three dimensional polyhedral light-reflecting member corresponds to the entirety of the depth of the trench in an absence of any spacer elements being used to bolster the height of the three-dimensional polyhedral light-reflecting member within the trench.

8. The optical transmission substrate according to claim 1, wherein a base of the trench and one of the clad layers are formed directly on the main surface of the optical transmission substrate.

9. An optical coupling component inserted into a trench that opens, substantially perpendicular to an optical waveguide of an optical transmission substrate, in the main surface of the optical transmission substrate, the optical coupling component comprising:
    a three-dimensional polyhedral light-reflecting member formed of a monocrystal inorganic solid non-metal wafer and having a mirror surface configured to obliquely intersect the optical axis of the optical waveguide whose end face is in close contact with the optical coupling component to provide the optical transmission substrate with a structure for optical coupling with the outside,
    wherein a depth of the trench spans from the main surface of the optical transmission substrate and through an entirety of the depths of the optical waveguide and two clad layers for enclosing the optical waveguide there between, a width of the three-dimensional polyhedral light-reflecting member corresponds to a width of the trench, and a depth of the three dimensional polyhedral light-reflecting member corresponds to an entirety of the depth of the trench, and
    wherein the three-dimensional polyhedral light-reflecting member has a scalene triangular cross section, and a plurality of surfaces, other than the minor surface, of the three-dimensional polyhedral light-reflecting member are in face-contact with the inner wall surfaces of the trench.

10. The optical coupling component according to claim 9, wherein the mirror surface is provided as a surface of the three-dimensional polyhedron and has concave portions corresponding to the channels of the optical waveguide.

11. The optical coupling component according to claim 10, further comprising a positioning member for positioning the level of the mirror surface with respect to the optical axis of the optical waveguide.

12. The optical coupling component according to claim 9, wherein the depth of the three dimensional polyhedral light-reflecting member corresponds to the entirety of the depth of the trench in an absence of any spacer elements being used to bolster the height of the three-dimensional polyhedral light-reflecting member within the trench.

13. The optical coupling component according to claim 9, wherein a base of the trench and one of the clad layers are formed directly on the main surface of the optical transmission substrate.

14. A method for interfacing an optical waveguide of an optical transmission substrate that transmits an optical signal with the outside, the method comprising the steps of:
  forming two clad layers for enclosing the optical waveguide there between;
  opening a trench, substantially perpendicular to the optical waveguide, in the main surface of the optical transmission substrate; and
  forming an optical coupling unit in the trench and in close contact with an end face of the optical waveguide, said optical coupling unit including a three-dimensional polyhedral light-reflecting member formed of a monocrystal inorganic solid non-metal wafer and having a minor surface that obliquely intersects the optical axis of the optical waveguide to provide the optical transmission substrate with a structure for optical coupling with the outside,
  wherein a depth of the trench spans from the main surface of the optical transmission substrate and through an entirety of the depths of the optical waveguide and the two clad layers, a width of the three-dimensional polyhedral light-reflecting member corresponds to a width of the trench, and a depth of the three dimensional polyhedral light-reflecting member corresponds to an entirety of the depth of the trench, and
  wherein the three-dimensional polyhedral light-reflecting member has a scalene triangular cross section, and a plurality of surfaces, other than the mirror surface, of the three-dimensional polyhedral light-reflecting member are in face-contact with the inner wall surfaces of the trench.

15. The method according to claim 14, wherein the depth of the three dimensional polyhedral light-reflecting member corresponds to the entirety of the depth of the trench in an absence of any spacer elements being used to bolster the height of the three-dimensional polyhedral light-reflecting member within the trench.

16. The method according to claim 14, wherein a base of the trench and one of the clad layers are formed directly on the main surface of the optical transmission substrate.

* * * * *